(12) United States Patent
Maljevic

(10) Patent No.: US 8,302,935 B2
(45) Date of Patent: Nov. 6, 2012

(54) UNIVERSAL CABLE PULLER

(76) Inventor: Antoni Maljevic, Torrington, CT (US)

( * ) Notice: Subject to any disclaimer, the term of this patent is extended or adjusted under 35 U.S.C. 154(b) by 105 days.

(21) Appl. No.: 12/801,808

(22) Filed: Jun. 25, 2010

(65) Prior Publication Data

US 2011/0012076 A1     Jan. 20, 2011

Related U.S. Application Data

(60) Provisional application No. 61/213,777, filed on Jul. 14, 2009.

(51) Int. Cl.
| | |
|---|---|
| B66F 7/26 | (2006.01) |
| B60S 9/22 | (2006.01) |
| B25C 11/00 | (2006.01) |
| B65H 59/00 | (2006.01) |
| B23Q 3/02 | (2006.01) |
| B23Q 3/18 | (2006.01) |
| B23P 19/04 | (2006.01) |
| B25B 27/00 | (2006.01) |
| B25B 27/14 | (2006.01) |

(52) U.S. Cl. ............. 254/34; 254/35; 254/21; 254/26 E; 254/27; 254/134.3 R; 269/95; 269/63; 29/244; 29/270; 29/278

(58) Field of Classification Search .................... 254/34, 254/35, 21, 26 E, 27, 134.3 R; 269/95, 63; 29/244, 270, 278
See application file for complete search history.

(56) References Cited

U.S. PATENT DOCUMENTS

| 1,783,256 | A | | 12/1930 | Miller |
|---|---|---|---|---|
| 4,230,305 | A | | 10/1980 | Comroe |
| 4,338,977 | A | * | 7/1982 | McNully ......................... 140/70 |
| 4,736,978 | A | | 4/1988 | Cielker |
| 5,052,660 | A | | 10/1991 | Bergman |
| 5,395,091 | A | | 3/1995 | Craddock |
| D390,763 | S | | 2/1998 | Nasir |
| 5,904,074 | A | * | 5/1999 | Herbert ............................ 81/8.1 |
| 6,499,778 | B2 | | 12/2002 | Boulay |
| 6,651,959 | B1 | | 11/2003 | Whitmer |
| 2009/0188691 | A1 | * | 7/2009 | Hahn ........................ 173/162.2 |

OTHER PUBLICATIONS

"Cable Puller Tool", Pacific Custom Cable Inc., http://www.pacific-cable.com/More_Pages/Wire_Puller_Tool/Cable-Puller-Tool.html, 4 pages printed from the Internet on May 4, 2009.

* cited by examiner

Primary Examiner — Monica Carter
Assistant Examiner — Nirvana Deonauth
(74) Attorney, Agent, or Firm — Richard C. Litman

(57) ABSTRACT

The universal cable puller is a flexible elongate member having a handgrip on one end and an adapter fitting on the other end. The adapter fitting is preferably threaded and accepts a correspondingly threaded adapter. A kit of adapters may be provided. Each adapter has a different head that accepts a corresponding cable connector.

7 Claims, 4 Drawing Sheets

UNIVERSAL CABLE PULLER

CROSS-REFERENCE TO RELATED APPLICATION

This application claims the benefit of U.S. Provisional Patent Application Ser. No. 61/213,777, filed Jul. 14, 2009.

BACKGROUND OF THE INVENTION

1. Field of the Invention

The present invention relates generally to electrical tools for wire and cable, and particularly to a universal cable puller for pulling telephone cable, coaxial cable, computer or Ethernet cable, fiber optic cable, and the like.

2. Description of the Related Art

Many homes and businesses require the installation of cables behind the walls of the structure. In order to avoid removing and replacing large sections of the walls of the building, small openings are formed in the walls or ceiling and the cable is pulled or routed from one opening to another. The cable may be of various types and diameter and may terminate in different types of connectors, e.g., RJ-45 connectors, F-connectors, etc. There is no single tool that has been found universally acceptable for gripping the ends of different types of cables to pull the cables through the openings in walls and ceilings.

Thus, a universal cable puller solving the aforementioned problems is desired.

SUMMARY OF THE INVENTION

The universal cable puller is a hand tool for pulling cable of the kind having male wire connectors on their ends, as exemplified by such cable as Cat-5 (RJ-45 connectors)), Coaxial, Telephone (RJ-11), and the like. The universal cable puller has a 23-inch flexible arm made from a length of flexible metal tubing about one-half inch in diameter. One end of the tubing includes a rubber grip, and the other end of the tubing includes a one-inch by one-half inch threaded receptacle fitting adapted for receiving interchangeable threaded adapters, which function as receptacles for a variety of male plugs that are attached to the cables. The user connects the cable plug to the adapter, which securely retains the cable while pulling the cable through conduits, walls, and the like.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
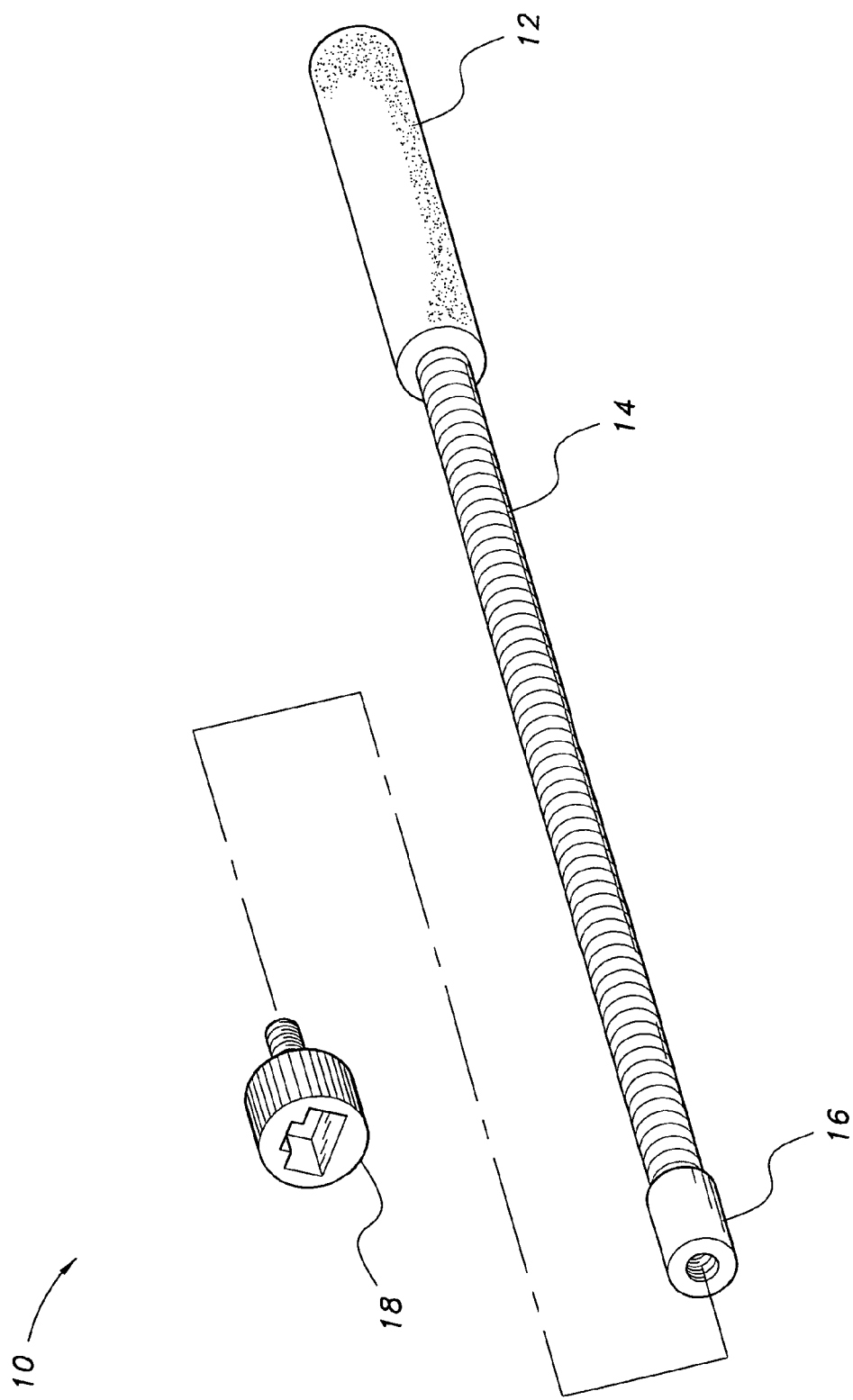
FIG. 1 is a partially exploded, perspective view of a universal cable puller according to the present invention.
Figure 2:
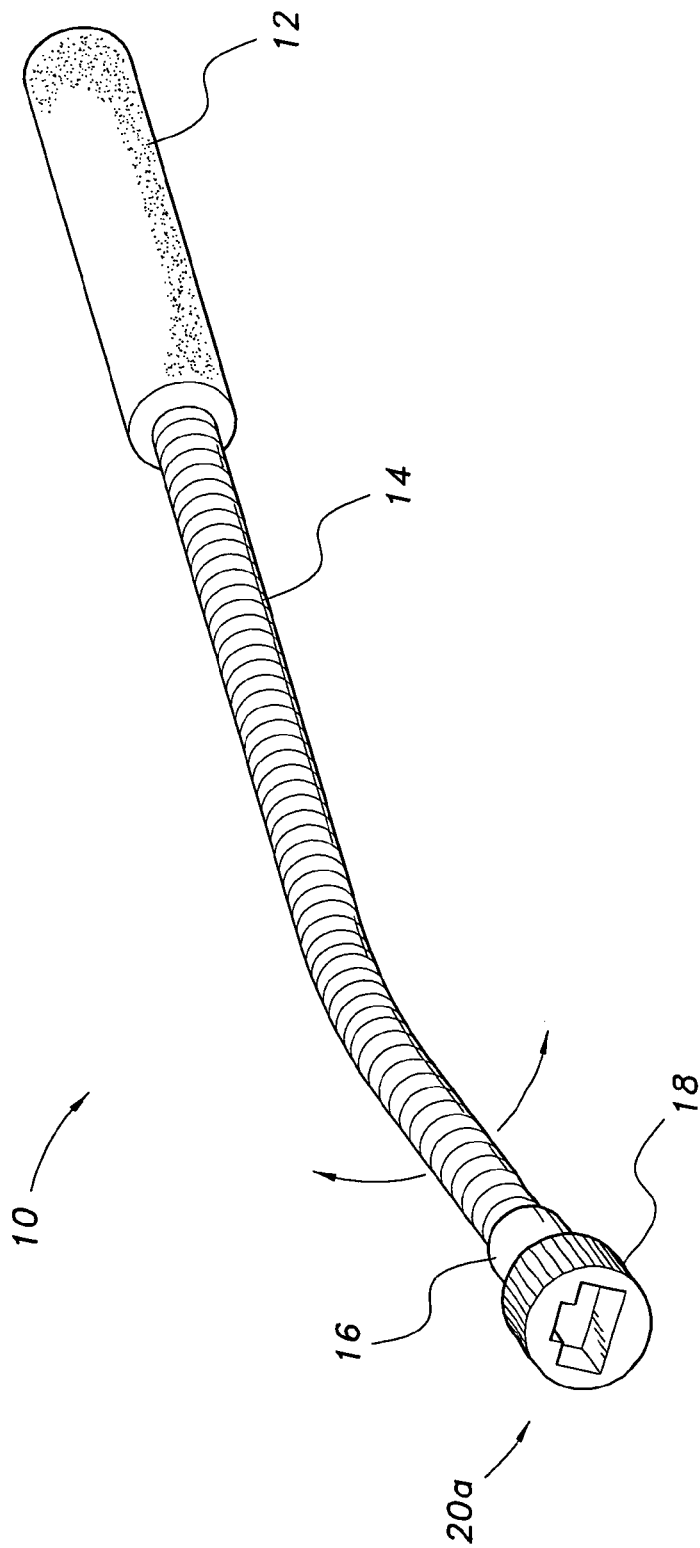
FIG. 2 is a front perspective view of a universal cable puller according to the present invention.

As shown in FIGS. 1 and 2, the universal cable puller 10 includes an elongate flexible member 14, which is preferably made of metal tubing. The member 14 may be about twenty-three inches long. The tubing is malleable and retains the shape that it is bent to when working with the material.

Preferably, the metal tubing of flexible member 14 is approximately one-half inch in diameter. A rubber handgrip 12 is disposed on one end of the elongate metal tubing 14. A 1"×½" adapter or receptacle fitting 16 is welded or otherwise permanently attached to the remaining end of flexible member 14. The adapter 16 is preferably a female adapter, and is preferably internally threaded. Interchangeable adapters 18 having externally threaded studs extending therefrom can be inserted and threaded onto the receptacle fitting 16 to facilitate connection of the cable puller 10 to a specific cable end.

Figure 3:
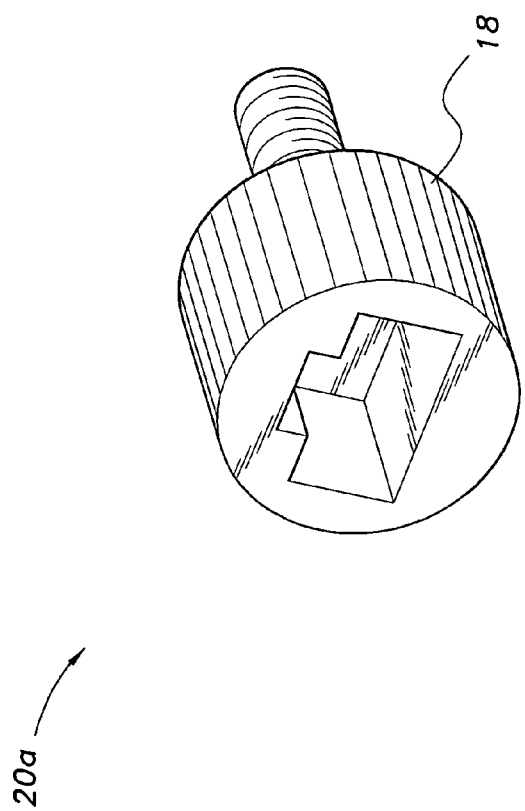
FIG. 3 is a perspective view of an adapter for a universal cable puller according to the present invention, the adapter having a CAT 5 receptacle.
Figure 4:
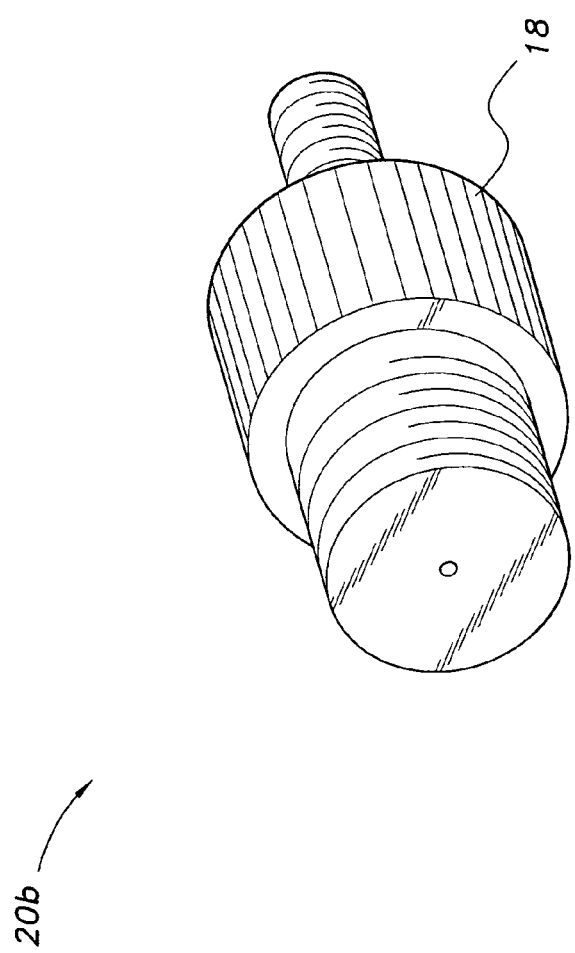
FIG. 4 is a perspective view of another adapter for a universal cable puller according to the present invention, the adapter having a coax receptacle.

As shown in FIG. 3, one such threaded adapter 18 has a CAT 5 or CAT 5e receptacle or socket 20a configured so that a cable having a CAT 5 male plug (normally an RJ-45 plug) can be plugged into and pulled by the puller 10. As shown in FIG. 4, another such threaded adapter 18 has a female coax head or socket 20b so that a cable having a male coaxial cable connector can be connected to and pulled by puller 10, although the adapter 18 may alternatively have a PL-259 male coaxial cable connector for receiving an SO-239 female coaxial connector attached to the end of the coaxial cable.

It is contemplated that the universal cable puller 10 may be equipped with a kit of threaded adapters 18 having a wide variety of adapter heads so that the cable puller 10 can be used to pull a variety of cable types, such as Cat 5, RJ-11 terminated telephone cable, PL-259 or SO-239 terminated coaxial cable, and the like.

It is to be understood that the present invention is not limited to the embodiment described above, but encompasses any and all embodiments within the scope of the following claims.

I claim:

1. A universal cable puller, comprising:
   a flexible, elongate member having a first end and a second end, wherein the flexible member consists of a continuous tubular member;
   a handgrip disposed on the first end;
   a threaded adapter fitting disposed on the second end;
   at least one threaded cable-connecting adapter removably threadable into the adapter fitting, the cable-connecting adapter having a head configured for receiving and retaining a corresponding connector attached to a cable end, thereby enabling the cable to be pulled by the cable puller, wherein the at least one cable-connecting adapter comprises a kit of interchangeable threaded cable-connecting adapters, each of the interchangeable adapters having an externally threaded stud extending therefrom at one end and a planar end surface at an opposite end, wherein the planar end surface includes a distinctly configured recess corresponding to an associated cable, the stud releasably engaging said adapter fitting to facilitate connection of the at least one cable-connecting adapter to a cable end specifically compatible with a selected one of the adapters.

2. The universal cable puller according to claim 1, wherein said flexible, elongate member is made of metal tubing.

3. The universal cable puller according to claim 1, wherein said handgrip is made of a resilient material.

4. The universal cable puller according to claim 1, wherein said threaded adapter fitting is welded to said flexible, elongate member.

5. The universal cable puller according to claim 1, wherein said kit of interchangeable threaded cable-connecting adapters includes a computer networking cable connector adapter.

6. The universal cable puller according to claim 1, wherein said kit of interchangeable threaded cable-connecting adapters includes a telephone cable connector adapter.

7. The universal cable puller according to claim 1, wherein said kit of interchangeable threaded cable-connecting adapters includes a coaxial cable connector adapter.

* * * * *